US010411559B2

(12) United States Patent
Iso

(10) Patent No.: US 10,411,559 B2
(45) Date of Patent: Sep. 10, 2019

(54) DRIVING APPARATUS

(71) Applicant: Mitsuba Corporation, Gunma (JP)

(72) Inventor: Yukiyoshi Iso, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 100 days.

(21) Appl. No.: 15/522,093

(22) PCT Filed: Oct. 26, 2015

(86) PCT No.: PCT/JP2015/080099
§ 371 (c)(1),
(2) Date: Apr. 26, 2017

(87) PCT Pub. No.: WO2016/068073
PCT Pub. Date: May 6, 2016

(65) Prior Publication Data
US 2017/0366070 A1 Dec. 21, 2017

(30) Foreign Application Priority Data

Oct. 27, 2014 (JP) .................................. 2014-218056

(51) Int. Cl.
H02K 9/02 (2006.01)
H02K 3/28 (2006.01)
(Continued)

(52) U.S. Cl.
CPC ................. H02K 9/02 (2013.01); H02K 3/28 (2013.01); H02K 5/04 (2013.01); H02K 7/1166 (2013.01);
(Continued)

(58) Field of Classification Search
CPC .......... H02K 3/28; H02K 5/04; H02K 7/1166; H02K 9/02; H02K 11/33; H02K 2203/03;
(Continued)

(56) References Cited

U.S. PATENT DOCUMENTS 4,544,166 A * 10/1985 Karasawa ................. B60S 1/08
277/590
4,893,039 A * 1/1990 Isii ............................ B60S 1/16
310/88
(Continued)

FOREIGN PATENT DOCUMENTS

JP 2001061257 A 3/2001
JP 2001346352 A 12/2001
(Continued)

OTHER PUBLICATIONS

Supplementary European Search Report for Serial No. EP 15 85 5663 dated Apr. 18, 2018.
(Continued)

Primary Examiner — Julio C. Gonzalez
Assistant Examiner — Ahmed Elnakib
(74) Attorney, Agent, or Firm — McCormick, Paulding & Huber LLP

(57) ABSTRACT

In a driving apparatus having a casing 10A in which an electric motor 16 is housed, the driving apparatus further has: a rotating shaft 27 through which a torque of the electric motor 16 is transmitted, the rotating shaft 27 being formed with a worm 40; a worm wheel 41 which is disposed in the casing 10A, the worm wheel 41 having a worm gear 42 which is engaged with the worm 40; a terminal holder 31 which is disposed in the casing 10A, and which supports a terminal carrying a current to be supplied to the electric motor 16; and an air hole 78 which extends so as to penetrate the casing 10A, an inside of the casing 10A and an outside of the casing 10A communicating with each other through the air hole 78, wherein in a plan view perpendicular to an axis C1 serving as a rotation center of the worm wheel 41, the air hole 78 is disposed in an area defined by projection of an area occupied by the terminal holder 31 in a direction (Continued)

along an axis B1, and between the electric motor and an engaging part E1 of the worm 40 with the worm gear 42.

5 Claims, 13 Drawing Sheets

(51) Int. Cl.
*H02K 7/116* (2006.01)
*H02K 5/04* (2006.01)
*H02K 11/33* (2016.01)

(52) U.S. Cl.
CPC .......... *H02K 11/33* (2016.01); *H02K 2203/03* (2013.01); *H02K 2205/09* (2013.01)

(58) Field of Classification Search
CPC ...... H02K 2205/09; H02K 7/116; H02K 7/06; H02K 7/081; H02K 7/1163; B60S 1/166; B60S 1/26; B60S 1/589; F16H 57/039; F16H 21/40
USPC .......................... 310/58, 76 R, 88, 83, 64, 99
See application file for complete search history.

(56) References Cited

U.S. PATENT DOCUMENTS

| | | | | |
|---|---|---|---|---|
| 5,844,336 A | * | 12/1998 | Ohya | ...................... F02N 15/00 |
| | | | | 310/80 |
| 5,872,412 A | * | 2/1999 | Mita | ..................... H02K 7/1166 |
| | | | | 310/43 |
| 6,410,849 B1 | * | 6/2002 | Okabe | ...................... B60S 1/08 |
| | | | | 174/50 |
| 2014/0312731 A1 | | 10/2014 | Oguri et al. | |

FOREIGN PATENT DOCUMENTS

| | | | |
|---|---|---|---|
| JP | 2007-252159 A | | 9/2007 |
| JP | 2009112139 A | | 5/2009 |
| JP | 2009-124928 | * | 6/2009 |
| JP | 2009-124928 A | | 6/2009 |
| JP | 2011-72053 A | | 4/2011 |
| JP | 2014-027801 | * | 2/2014 |
| JP | 2014027801 A | | 2/2014 |

OTHER PUBLICATIONS

International Search Report for PCT Serial No. PCT/JP2015/080099 dated Dec. 10, 2015.

* cited by examiner

1

DRIVING APPARATUS

CROSS-REFERENCE TO RELATED APPLICATIONS

This application is a National Stage application of International Patent Application No. PCT/JP2015/080099, filed on Oct. 26, 2015, which claims priority to Japanese Patent Application Number 2014-218056, filed on Oct. 27, 2014, each of which is hereby incorporated by reference in its entirety.

TECHNICAL FIELD

The present invention relates to a driving apparatus including a casing in which an electric motor is housed.

BACKGROUND ART

One example of a conventionally-known driving apparatus is disclosed in Japanese Patent Application Laid-Open Publication No. 2011-72053, and includes a casing in which an electric motor is housed. In the casing of the driving apparatus disclosed in Japanese Patent Application Laid-Open Publication No. 2011-72053, a gear case and a cover are fixed to each other. An electric motor housed in the motor case has a stator and a rotor, and a rotating shaft is provided and rotated together with the rotor. A part of rotating shaft is fitted with a worm, and disposed in the gear case. A worm wheel is disposed in the gear case, and the worm wheel has a gear formed on a circumferential part of the worm wheel. The gear is engaged with the worm.

Additionally, the cover has an air hole which functions as an element for communicating the inside of the casing with the outside of the casing. The cover is fitted with a breather cap encircling the air hole. The breather cap functions as an element for ventilation through the air hole and for preventing a foreign substance from passing through the air hole. In the driving apparatus disclosed in Japanese Patent Application Laid-Open Publication No. 2011-72053, since the inside of the casing and the outside of the casing communicate with each other through the air hole, it is possible to suppress an increase in temperature difference and pressure difference between the inside of the casing and the outside of the casing.

SUMMARY

According to the driving apparatus disclosed in Japanese Patent Application Laid-Open Publication No. 2011-72053, in a plan view along an axis serving as a rotation center of the rotating shaft, the air hole is formed at a location which is the farthest from the electric motor in the longitudinal direction of the rotating shaft. This driving apparatus encounters a problem that it is difficult to discharge heat of the electric motor to the outside of the casing.

An object of the present invention is to provide a driving apparatus which can easily discharge heat of the electric motor to the outside of the casing.

In a driving apparatus according to one embodiment comprising a casing in which an electric motor is housed, the driving apparatus further comprises: a rotating shaft through which a torque of the electric motor is transmitted, the rotating shaft having an outer peripheral surface formed with a worm; a worm wheel which is disposed in the casing, the worm wheel having a worm gear which is engaged with the worm; a terminal holder which is disposed in the casing, and which supports a first terminal carrying a current to be supplied to the electric motor; and an air hole which extends so as to penetrate the casing, an inside of the casing and an outside of the casing communicating with each other through the air hole, wherein in a plan view perpendicular to an axis serving as a rotation center of the worm wheel, the air hole is disposed in an area defined by projection of an area occupied by the terminal holder in a direction along an axis of the rotating shaft, and between the electric motor and an engaging part of the worm with the worm gear.

The driving apparatus according to another embodiment further comprises: a control board housed in the casing, electric components for controlling the electric motor are mounted on the control board; and a second terminal mounted on the control board and connected to the first terminal, in the plan view, the air hole is disposed in the vicinity of an area occupied by the control board.

In the driving apparatus according to another embodiment, the casing includes: a first housing chamber in which the electric motor is housed; and a second housing chamber in which the worm wheel and the control board are housed, the second housing chamber communicates with an outside of the casing through the air hole.

The driving apparatus according to another embodiment further comprises: a wall disposed in the casing, the wall partitioning an inner space of the casing into the first housing chamber and the second housing chamber; and a shaft hole extending so as to penetrate the wall, the first housing chamber and the second housing chamber communicating with each other through the shaft hole, the rotating shaft being rotatable in the shaft hole.

In the driving apparatus according to another embodiment, the casing includes: a gear case forming the second housing chamber; and a cover covering an opening of the gear case, the air hole is provided to the cover, and the control board is supported by the cover.

According to the driving apparatus of one embodiment, since a distance to the air hole from the electric motor in a direction along an axis of the rotating shaft is short, it is possible to easily discharge heat of the electric motor to the outside of the casing.

DETAILED DESCRIPTION

Hereinafter, embodiments of the driving apparatus will be described in detail with reference to the drawings.

First Embodiment

Figure 1:
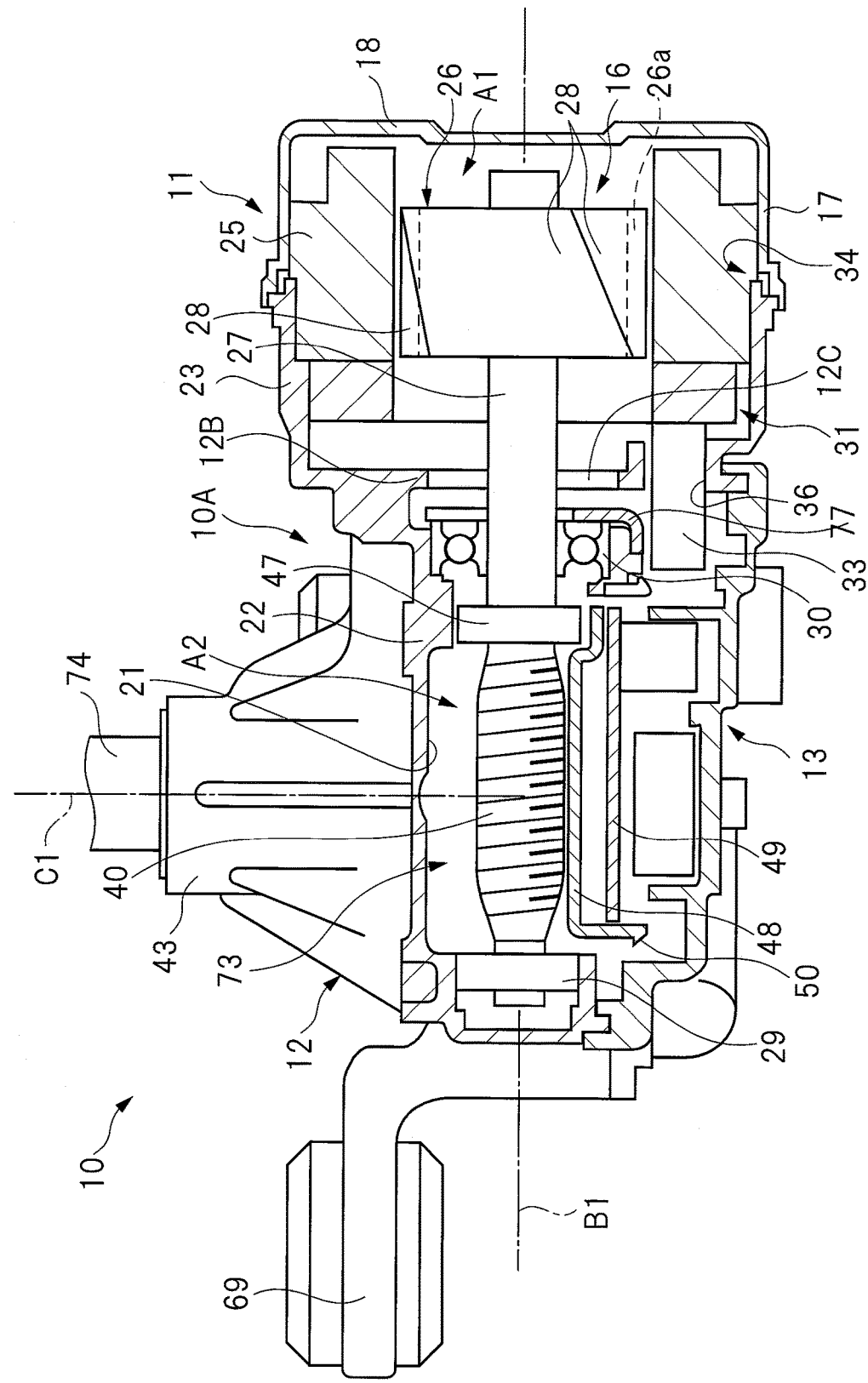
FIG. 1 is a sectional view showing a driving apparatus according to the first embodiment.

Hereinafter, the first embodiment of a driving apparatus will be described in detail with reference to FIGS. 1 to 8. A driving apparatus 10 shown in FIG. 1 is in its completely assembled state. The driving apparatus 10 includes a casing 10A. The casing 10A has a motor case 11, a gear case 12, and a cover 13. The motor case 11 is fixed to the gear case 12, using a screw 14. The cover 13 is fixed to the gear case 12, using screws 15, and covers an opening 12D of the gear case 12.

The motor case 11 and the gear case 12 form a first housing chamber A1, and the gear case 12 and the cover 13 form a second housing chamber A2. In other words, the first housing chamber A1 and the second housing chamber A2 are formed in the casing 10A. In the gear case 12, a wall 12B is formed so as to partition an inner space into the first housing chamber A1 and the second housing chamber A2. A shaft hole 12C extends in such a way as to penetrate the wall 12B. The first housing chamber A1 and the second housing chamber A2 communicate with each other through the shaft hole 12C.

The driving apparatus 10 includes an electric motor 16 and a speed-reducing mechanism 73. The electric motor 16 is disposed in the first housing chamber A1. The speed-reducing mechanism 73 is disposed in the second housing chamber A2.

The motor case 11 includes a cylindrical portion 17 and a wall 18 closing a first end of the cylindrical portion 17, the first end being one end in a direction along the axis B1. The motor case 11 is molded integrally out of insulating material such as synthetic resin. The material of the motor case 11 is not limited to the synthetic resin. Other materials, such as iron, may be used to make the motor case 11 such that an iron sheet is stamped by a press machine to form the motor case 11. An opening 34 is formed on a second end of the cylindrical portion 17. The gear case 12 includes a body 22 having a recession 21, and a cylindrical connecting portion 23 continuous with the body 22. The connecting portion 23 is fixed to the cylindrical portion 17, using a screw 14. The gear case 12 is integrally molded out of conductive material such as iron and aluminum. The wall 12B is formed on the inner surface of the connecting portion 23 along its entire circumference.

The electric motor 16 has a stator 25 and a rotor 26. The stator 25 is disposed in the first housing chamber A1, and does not rotate relative to the motor case 11 and the gear case 12. The stator 25 has a stator core and a plurality of coils wound around the stator core. The coils include three coils, i.e., "U-phase coil", "V-phase coil", and "W-phase coil".

The rotor 26 has a rotor core 26a and a permanent magnet 28 fixed to the outer peripheral surface of the rotor core 26a. The rotor 26 is disposed in such a way as to extend from the housing chamber A1 to the housing chamber A2. A rotating shaft 27 is disposed in such a way as to extend from the housing chamber A1 to the housing chamber A2, and fitted with two bearings, i.e., bearings 29 and 30 which rotatably support the rotating shaft 27. The rotor 26 is fixed to the outer periphery of the rotating shaft 27. The torque of the rotor 26 is thus transmitted to the rotating shaft 27, which causes the rotor 26 and rotating shaft 27 to rotate together around the axis B1. Both bearings 29 and 30 are supported by the gear case 12.

A sleeve 75 is provided and continuous with the gear case 12 and has a shaft hole 76. The shaft hole 76 has a center aligned with the axis B1, and has a bearing 30 fitted in the shaft hole 76. The shaft hole 76 is connected to the first housing chamber A1 through a shaft hole 12C, and connected to the second housing chamber A2. A stopper 77 is disposed between the sleeve 75 and the wall 12B, and positions the bearing 30 relative to the gear case 12 in a direction along the axis B1. A part of rotating shaft 27 in its length direction is disposed in the shaft hole 12C.

A worm 40 is fitted to the outer peripheral surface of one part of the rotating shaft 27, and disposed inside the recession 21 of the gear case 12. A permanent magnet 47 is fitted to the outer peripheral surface of another part of rotating shaft 27, and disposed inside the recession 21 of the gear case 12. The permanent magnet 47 is used as a sensor magnet, and has magnetic poles alternately arranged in a rotation direction of the rotating shaft 27.

Furthermore, a worm wheel 41 is disposed in the recession 21, and a worm gear 42 formed on the outer peripheral surface of the worm wheel 41 is engaged with the worm 40. An output shaft 74 is provided and rotated together with the worm wheel 41. A cylindrical portion 43 is provided and continuous with the gear case 12, and the output shaft 74 is rotatably fitted in the cylindrical portion 43. In FIG. 1 which is a front view of the driving apparatus 10 seen in a direction parallel with the axis B1, the rotating shaft 27 and the axis B1 are disposed between the cover 13 and the cylindrical portion 43. The output shaft 74 extends from the second housing chamber A2 to come out of the casing 10A. The worm 40 and the worm gear 42 collectively constitute the speed-reducing mechanism 73. An axis C1 is a rotation center of the output shaft 74, and does not intersect with the axis B1. In FIG. 1 which is the front view of the driving apparatus 10 seen in the direction parallel with the axis B1, the axis B1 and axis C1 are at right angles with each other.

Figure 6:
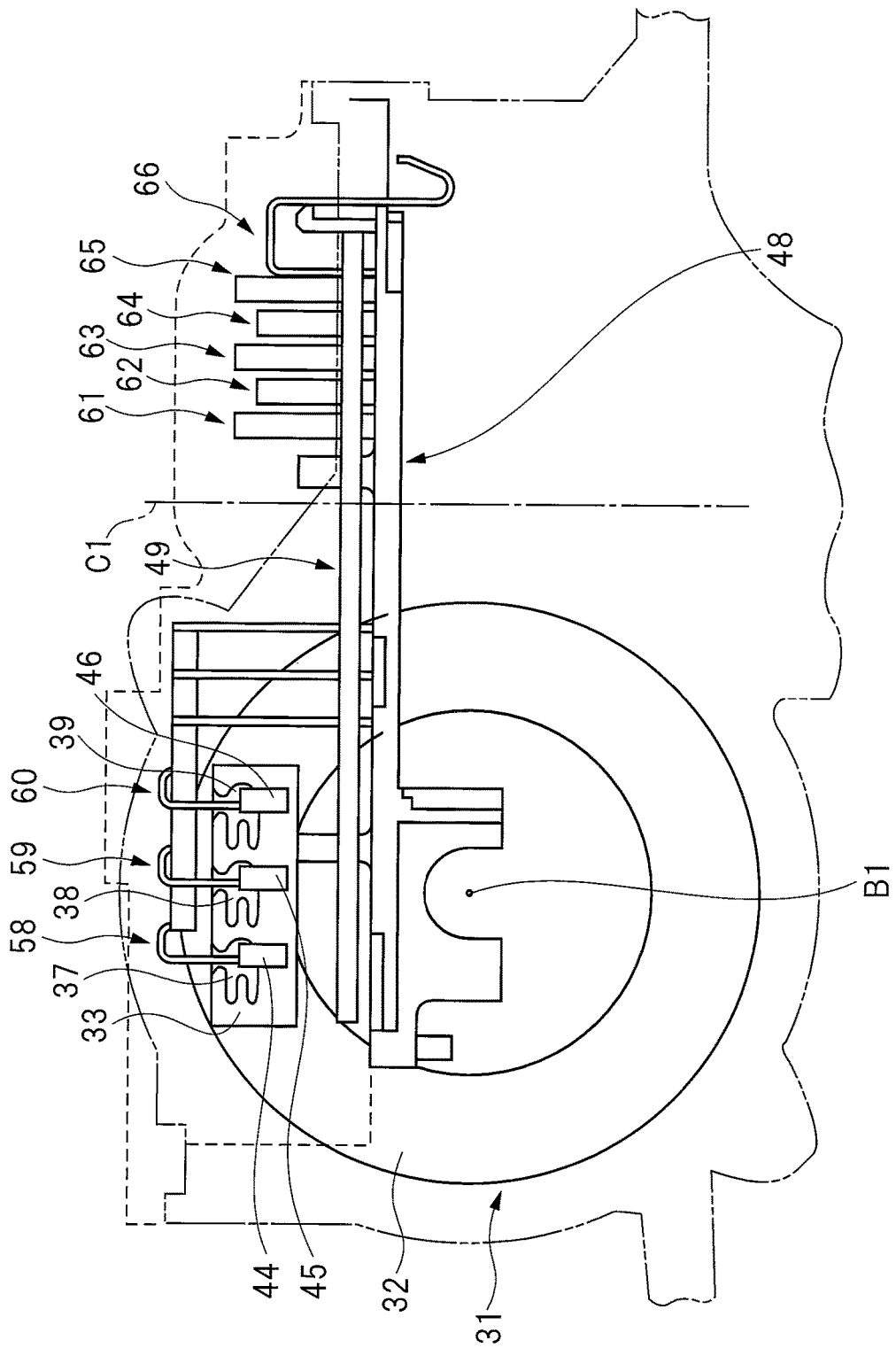
FIG. 6 is a schematic side view of a control board and a board cover, which are used in the driving apparatus of FIG. 1.

On the other hand, a terminal holder 31 is disposed in the connecting portion 23. The terminal holder 31 is integrally molded out of synthetic resin, and has a cylindrical portion 32 and a projecting portion 33 formed on a part of the cylindrical portion 32 in its circumferential direction. As shown in FIG. 6, in a plan view perpendicular to the axis B1, the projecting portion 33 is rectangular and disposed in a direction along a tangent to the inner circumference of the connecting portion 23.

Figure 7:
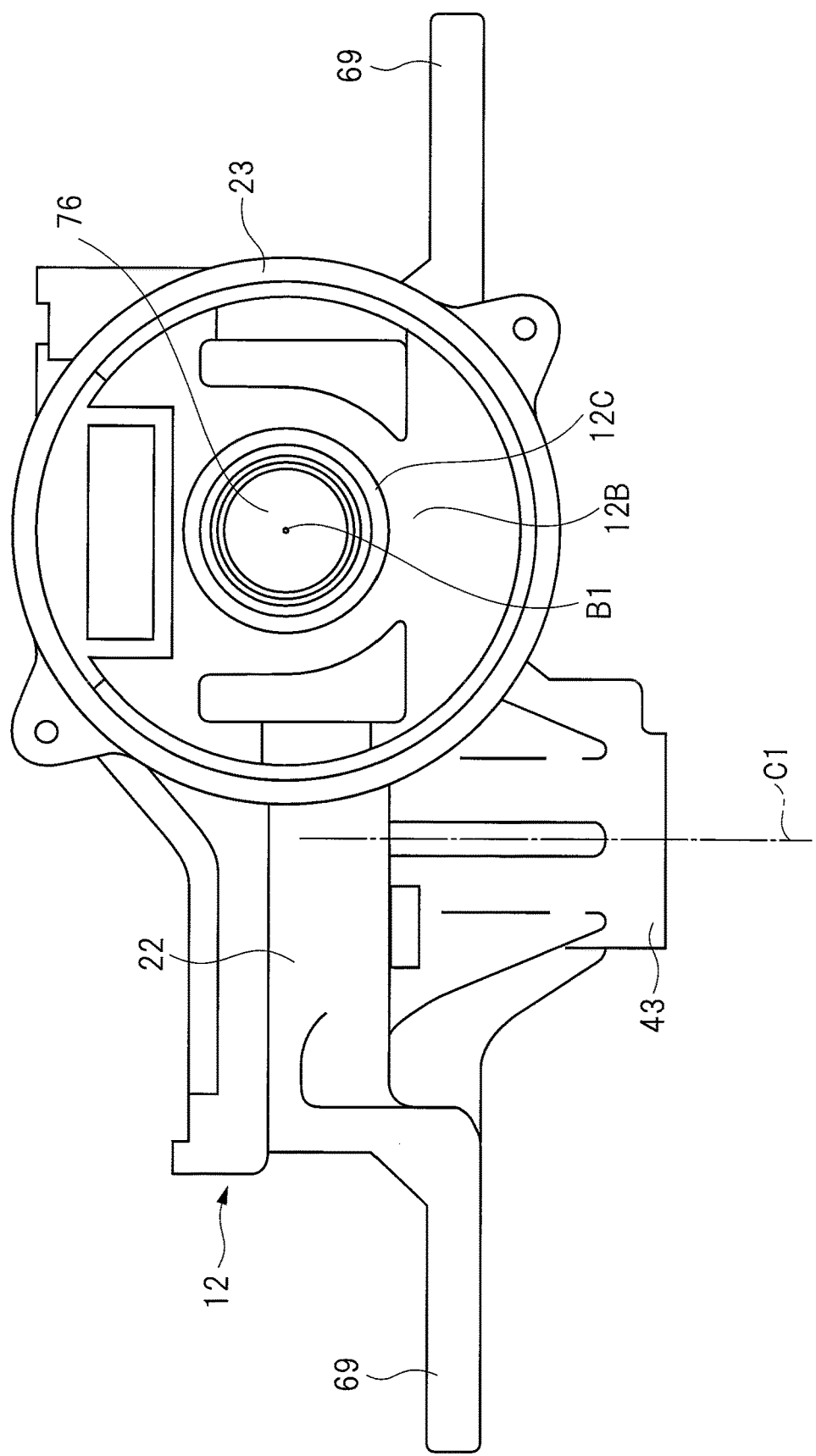
FIG. 7 is a side view of a gear case which is used in the driving apparatus of FIG. 1.
Figure 8:
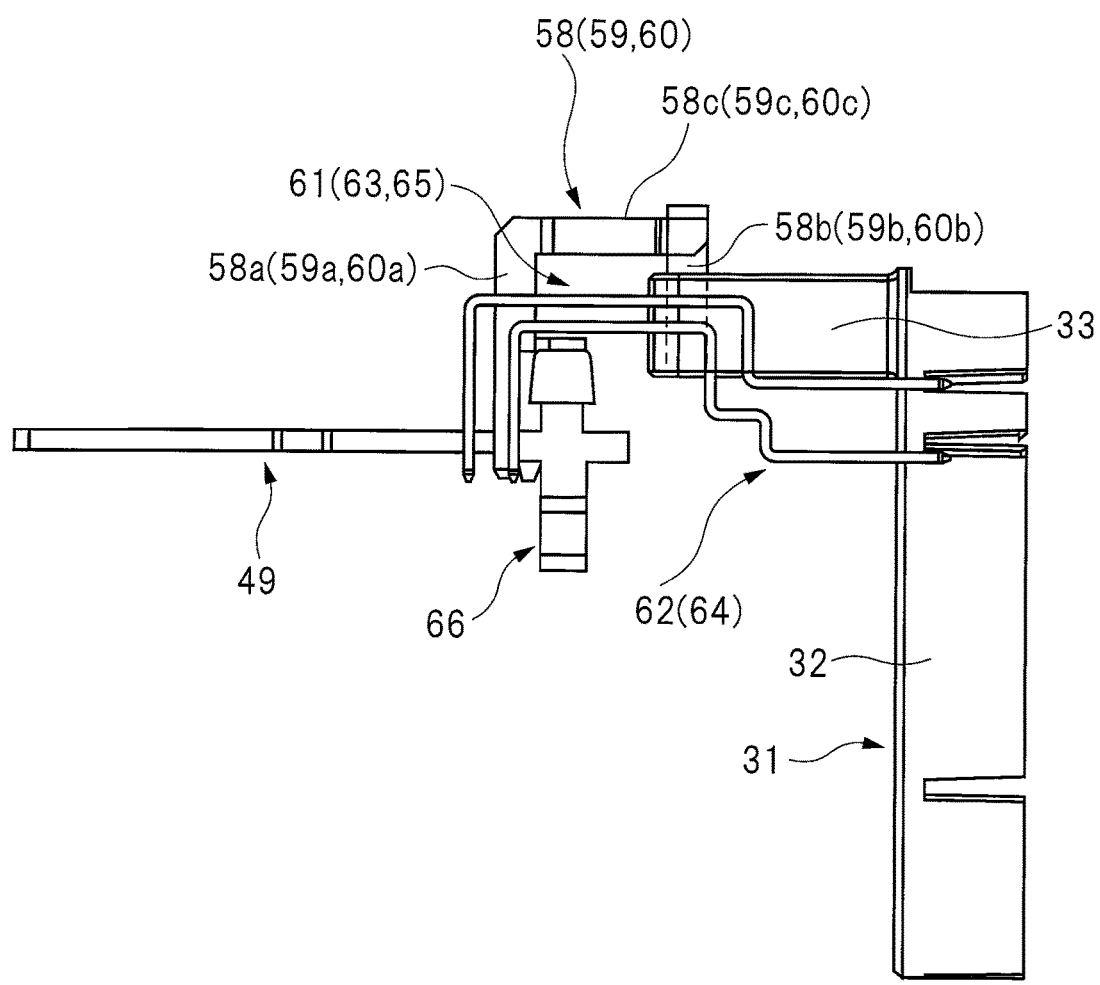
FIG. 8 is a side view of the control board and terminals, which are used in the driving apparatus of FIG. 1.

As shown in FIGS. 1 and 7, a through-hole 36 extends so as to penetrate the wall 12B. Through the through-hole 36, the first housing chamber A1 communicates with the second housing chamber A2. In a plan view perpendicular to the axis B1, through-hole 36 is disposed outside the shaft hole 12C. The through-hole 36 has an inner wall 36a.

With the terminal holder 31 fitted in the connecting portion 23, the projecting portion 33 projects into the second housing chamber A2 through the through-hole 36, as shown in FIG. 1. The projecting portion 33 is in contact with the inner wall 36a. The part of projecting portion 33 which is disposed in the second housing chamber A2 has terminal holding slots 37, 38, and 39, as shown in FIG. 6. The terminal holding slots 37, 38, and 39 are formed by cutting portions of the projecting portion 33 out in a direction along the axis C1.

Furthermore, a terminal 44 is provided in the terminal holding slot 37, a terminal 45 is provided in the terminal holding slot 38, and a terminal 46 is provided in the terminal holding slot 39. The terminals 44, 45, and 46 are respectively connected to the U-phase coil, V-phase coil, and W-phase coil. In other words, the terminals 44, 45, and 46 are arranged in the second housing chamber A2.

Figure 5:
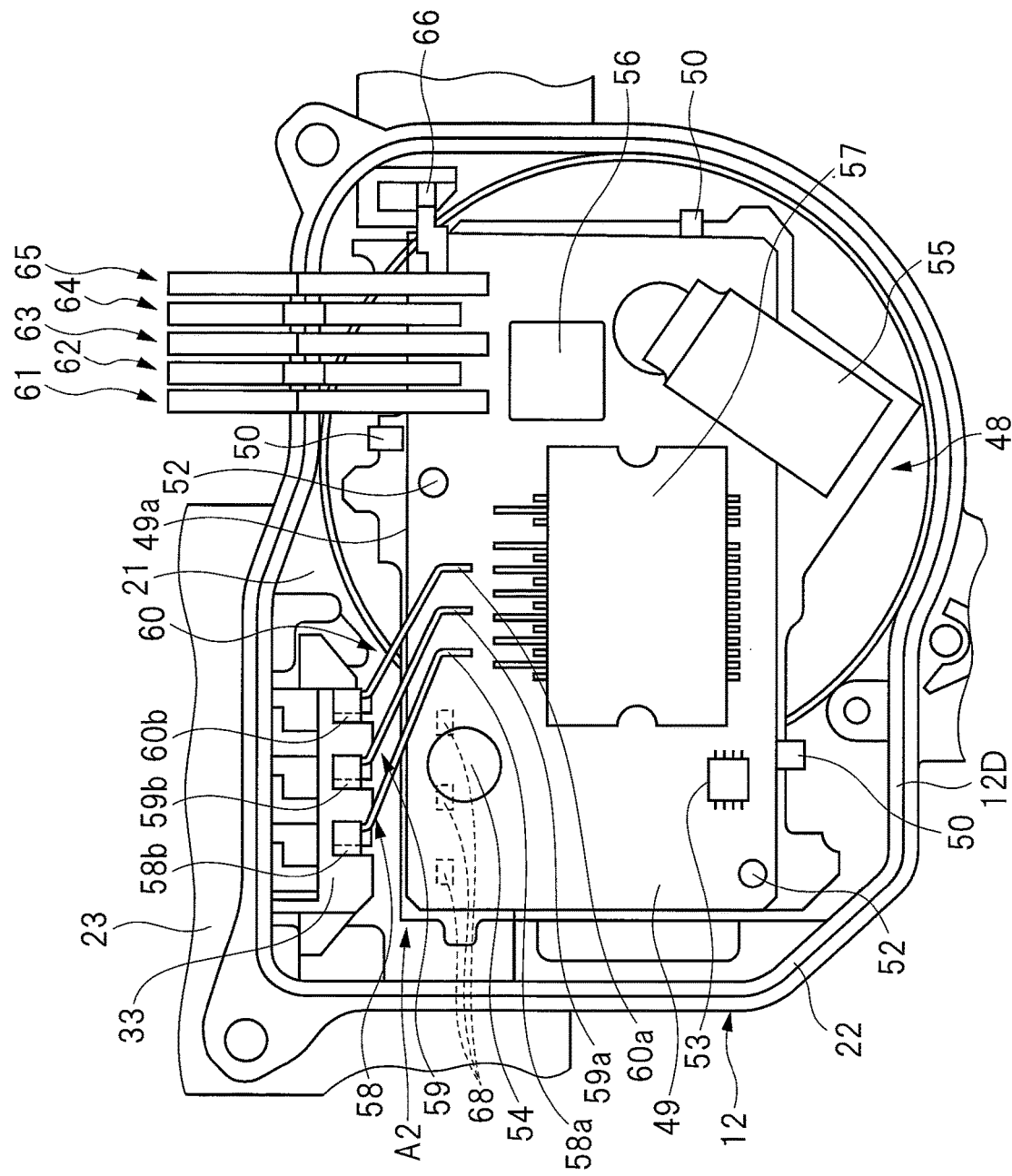
FIG. 5 is a bottom view of the driving apparatus of FIG. 1 with a cover detached from it.

As shown in FIGS. 1 and 5, a board cover 48 and a control board 49 are disposed in the second housing chamber A2. The board cover 48 is integrally molded of insulating material such as synthetic resin, into a plate-like shape. The board cover 48 has a plurality of locking claws 50. The cover 13 has a plurality of locking portions formed on its inner surface. The locking claws 50 are respectively locked onto the locking portions. This fixes the board cover 48 to the cover 13.

Figure 2:
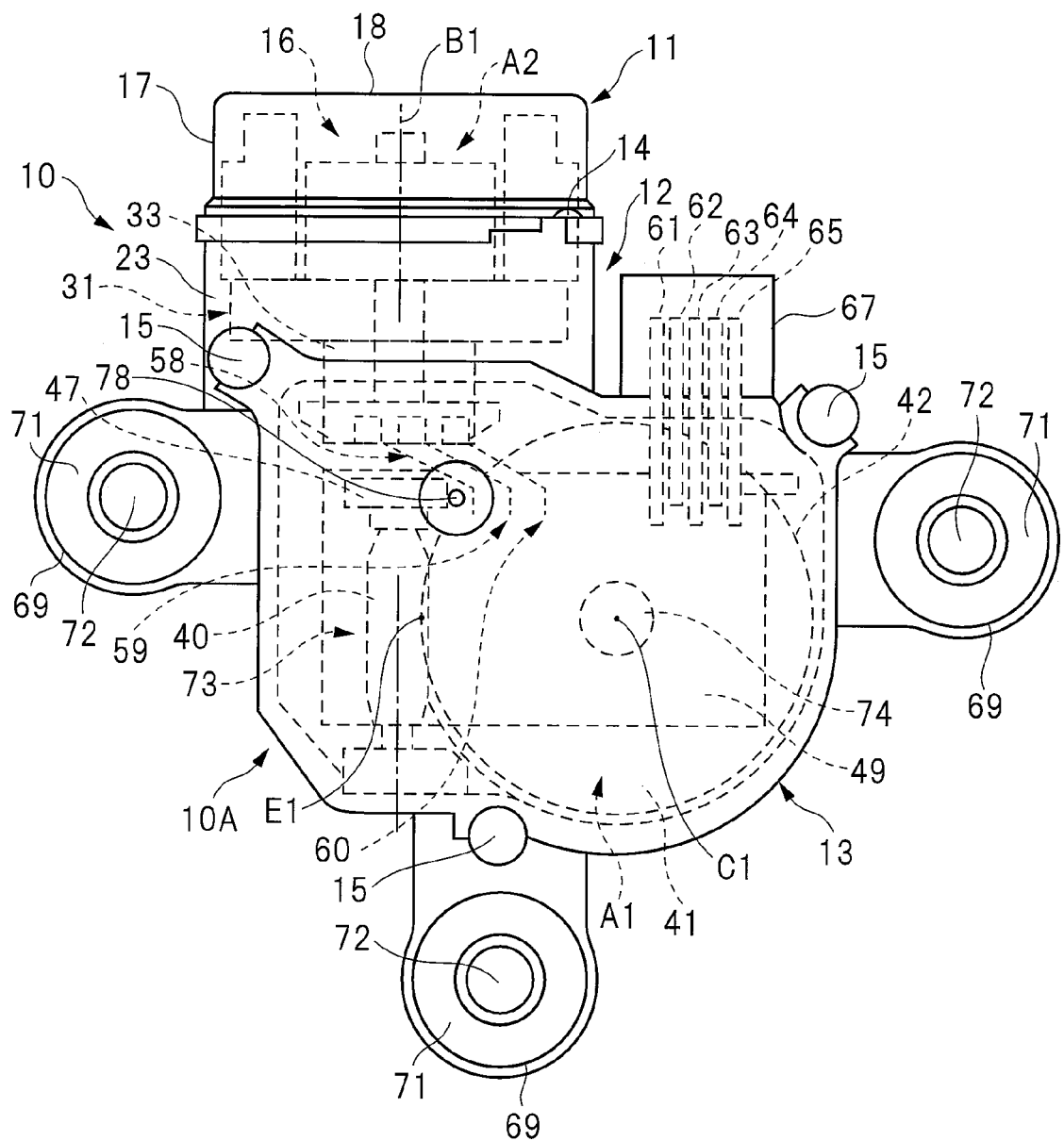
FIG. 2 is a bottom view of the driving apparatus of FIG. 1.
Figure 3:
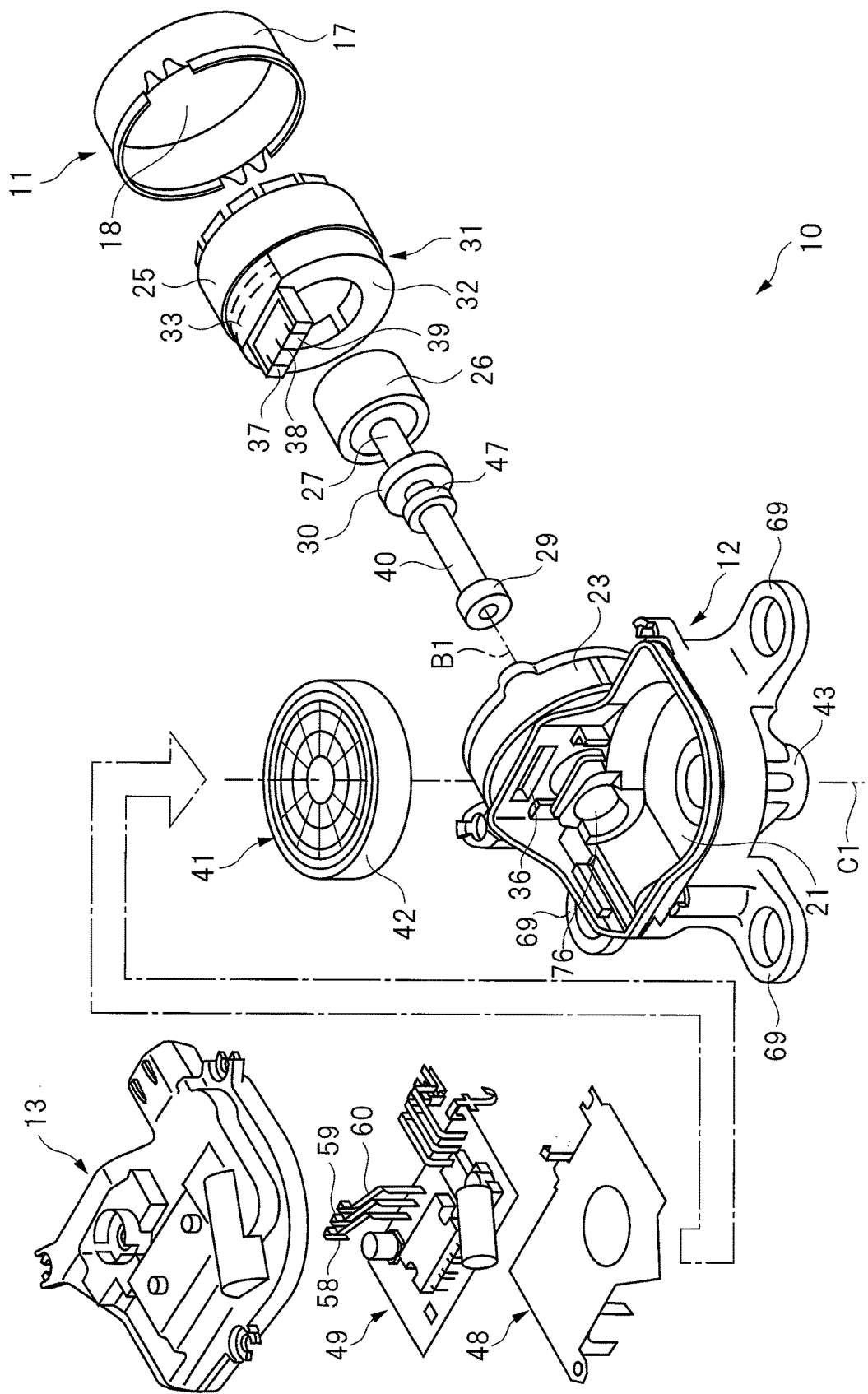
FIG. 3 is an exploded perspective view of the driving apparatus of FIG. 1.
Figure 4:
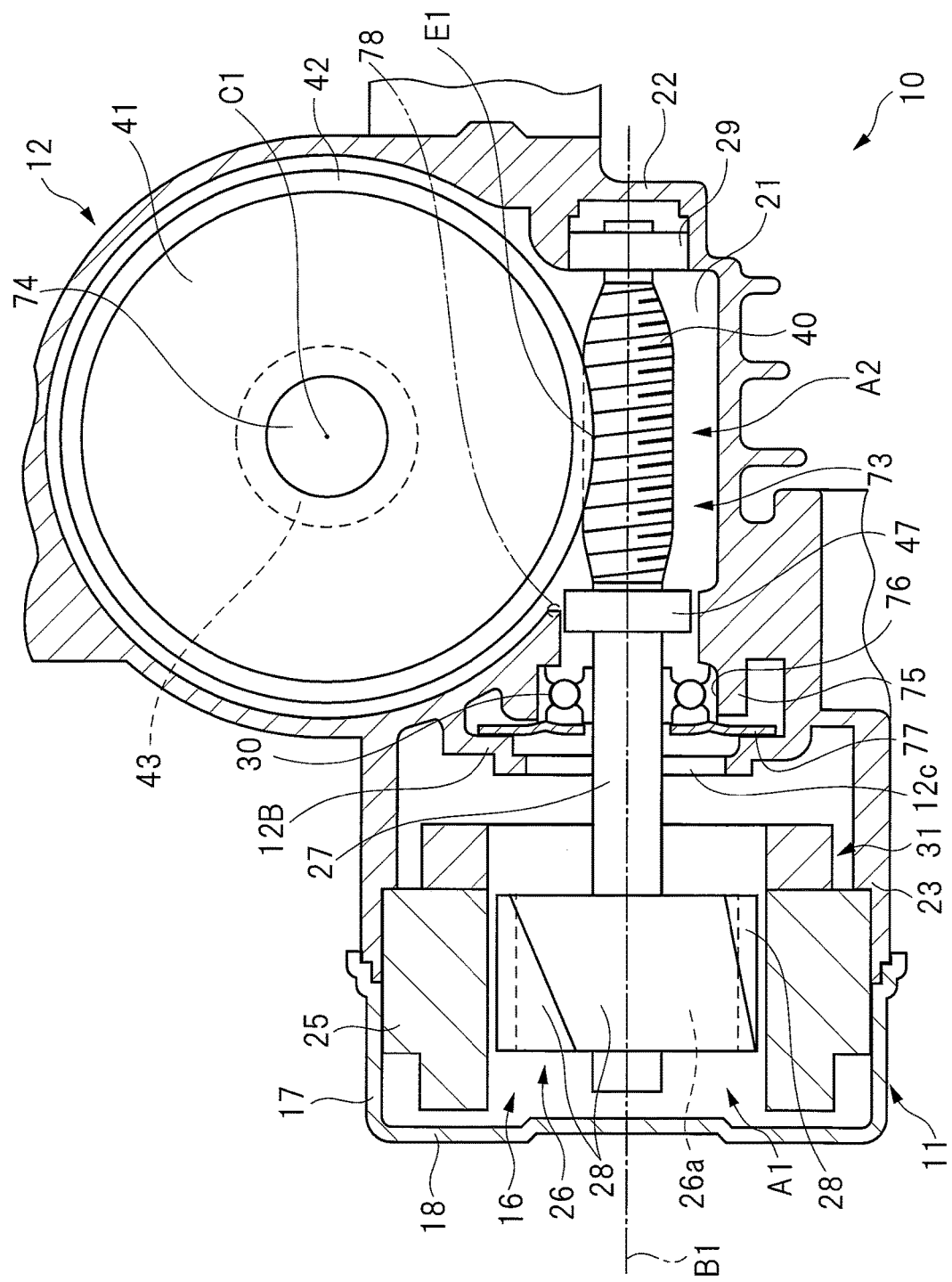
FIG. 4 is a sectional view of the driving apparatus of FIG. 1.

The control board 49 is disposed between the cover 13 and the board cover 48 in a direction along the axis C1. In FIGS. 2 and 5 which are bottom views of the driving apparatus 10, the control board 49 is substantially rectangular. The control board 49 is positioned and fixed to the cover 13, using a plurality of positioning screws 52. This sets the control board 49 at right angles with the axis C1, as shown in FIG. 6.

The control board 49 is molded out of insulating material, and carries an electric circuit as well as various electric components. The electric components mounted on the control board 49 include a controller chip 53, capacitors 54 and 55, an inductor 56, an inverter chip 57 having a plurality of switching elements, terminals 58, 59, and 60, terminals 61 to 65, a ground terminal 66, and magnetic sensors 68. The three magnetic sensors 68 are Hall ICs which detect the intensity and switching of a magnetic field generated by the permanent magnet 47 and output an electric signal.

As shown in FIG. 2, the cover 13 has a connector 67. First ends of the terminals 61 to 65 are disposed in the connector 67, and second ends of the terminals 61 to 65 are connected to the electric circuit of the control board 49. A socket for a power cord connected to an external power supply is connected to the connector 67. The ground terminal 66 connects the electric circuit to the gear case 12. Next, the terminals 58, 59, and 60 will be described with reference to FIG. 8. The terminals 58, 59, and 60 are each integrally molded out of conductive material. The terminal 58 has leg portions 58a and 58b and a connecting portion 58c connecting the leg portion 58a to the leg portion 58b. The leg portion 58a has one end fixed to the control board 49, and the other end connected to the connecting portion 58c.

The terminal 59 has leg portions 59a and 59b and a connecting portion 59c connecting the leg portion 59a to the leg portion 59b. The leg portion 59a has one end fixed to the control board 49, and the other end connected to the connecting portion 59c. The terminal 60 has leg portions 60a and 60b and a connecting portion 60c connecting the leg portion 60a to the leg portion 60b. The leg portion 60a has one end fixed to the control board 49, and the other end connected to the connecting portion 60c. All of the leg portions 58a, 58b, 59a, 59b, 60a, and 60b extend in a thickness direction of the control board 49, that is, extend in a direction along the axis C1.

Furthermore, in FIG. 5 which is a plan view of the driving apparatus 10, the leg portions 58b, 59b, and 60b are disposed outside the edge 49a of the control board 49. The leg portion 58b of the terminal 58 is disposed in the terminal holding slot 37, and connected to the terminal 44 supported by the projecting portion 33. The leg portion 59b of the terminal 59 is disposed in the terminal holding slot 38, and connected to the terminal 45 supported by the projecting portion 33. The leg portion 60b of the terminal 60 is disposed in the terminal holding slot 39 and is connected to the terminal 46 supported by the projecting portion 33.

The gear case 12 has a plurality of mounts 69 overhanging from its outer peripheral surface, and an annular bush 71 is fitted in a hole of each mount 69. The bush 71 is integrally molded out of rubber-like elastic material. Each bush 71 has a hole 72 in which a screw is screwed to mount the driving apparatus 10 to a vehicle body frame or a bracket.

Next, a ventilating mechanism for causing the second housing chamber A2 to communicate with the outside of the casing 10A will then be described. The cover 13 has an air hole 78 extending so as to penetrate the cover 13 in the direction of the axis C1. In FIG. 2 which is a plan view perpendicular to the axis C1, the location of the air hole 78 is defined as follows. The air hole 78 is disposed in an area defined by projection of an area occupied by the projecting portion 33 of the terminal holder 31 in a direction along the axis B1, and which is an area between the electric motor 16 and an engaging part E1 where the worm 40 and the worm gear 42 are engaged with each other. The engaging part E1 is disposed substantially in the center of an area occupied by the control board 49 in the direction along the axis B1.

More specifically, in FIG. 2 which is a bottom view of the driving apparatus 10, the air hole 78 is disposed between the position of the permanent magnet 47 and the worm gear 42. The position of the air hole 78 in the direction along the axis B1 is close to the area occupied by the permanent magnet 47. The position of the air hole 78 is within the area occupied by the control board 49. Specifically, the position of the air hole 78 is within the half of area occupied by the control board 49 which is closer to the rotating shaft 27 in the longitudinal direction of the control board 49.

The cover 13 may be provided with a breather plug encircling the air hole 78. The breather plug is a mechanism which opens and closes in response to a change in the internal pressure of the second housing chamber A2. This mechanism is known to the public through its disclosure in for example, Japanese Unexamined Patent Application Publication No. 2011-72053. The breather plug, therefore, will not be described or depicted in detail in the following explanation. The cover 13 is fitted also with a filter which covers the air hole 78. The filter is an element which allows air passage while blocking a foreign substance.

The operation and control of the driving apparatus 10 will then be described. Power is supplied from the external power supply to the electric circuit of the control board 49 through the terminals 61 to 65. As a result, the switching elements of the inverter chip 57 are switched on and off to cause current to flow through the three coils in order, which generates a rotating magnetic field, thus causing the rotor 26 and rotating shaft 27 to rotate together. Power supplied from the external power supply is channeled through the terminals 58, 59, and 60 and the terminals 44, 45, and 46 to the three coils. The controller chip 53 detects the rotation position of the rotating shaft 27, based on a signal from the magnetic sensor 68, and controls timing of switching on and off the switching elements and the ratio of switching on the switching elements, thereby controls the number of revolutions, i.e., rotating speed of the rotating shaft 27.

In this manner, the electric motor 16 has a structure in which current flowing through the coils of the stator 25 causes the stator 25 to interact with the permanent magnet 28 of the rotor core 26a, thus generating a rotating magnetic field. This structure does not include a brush and a commutator. The electric motor 16 is, therefore, a brushless motor.

Incidentally, the electric motor 16 generates heat when carrying a current. This current also causes the terminals 44 to 46 and terminals 58 to 65, which are electric components mounted on the control board 49, to generate heat. As a result, the temperature of the first housing chamber A1 as well as the temperature of the second housing chamber A2 rises. Heat from the first housing chamber A1 is discharged through the shaft holes 12C and 76 to the second housing chamber A2. In the first housing chamber A1 and second housing chamber A2, air expands as their temperatures rise, causing the internal pressure to increase.

When a temperature difference arises between the first housing chamber A1 and second housing chamber A2 and the outside of the casing 10A, heat from the first housing chamber A1 and second housing chamber A2 flows through the air hole 78 to be discharged to the outside of the casing 10A. This process suppresses a rise in the temperatures of the first housing chamber A1 and second housing chamber A2. When a pressure difference arises between the interior of the first housing chamber A1 and second housing chamber A2 and the outside of the casing 10A, on the other hand, the air hole 78 communicatively connecting the interior of the first housing chamber A1 and second housing chamber A2 to the outside of the casing 10A also works to let air escape, thus suppressing an increase in the internal pressures of the first housing chamber A1 and second housing chamber A2.

In this manner, the air hole 78 plays a role of suppressing a rise in the temperatures of the first housing chamber A1 and second housing chamber A2 as well as a role of suppressing an increase in the internal pressures of the first housing chamber A1 and second housing chamber A2. As shown in FIG. 2, the air hole 78 is disposed between the area occupied by the electric motor 16 and the engaging part E1 in the direction along the axis B1. Therefore, when heat from the first housing chamber A1 is transmitted through the shaft holes 12C and 76 to the second housing chamber A2, this heat flows through the air hole 78 to come out of the casing 10A, thus failing to spread across the entire area occupied by the control board 49 in the direction along the axis B1. The air hole 78 is disposed closer to the control board 49 than the shaft holes 12C and 76. As a result, heat generated from the terminals mounted on the control board 49 in the second housing chamber A2 tends to flow through the air hole 78 and come out of the casing 10A before reaching the first housing chamber A1. Hence heat from the electric motor 16 is readily released to the outside of the casing 10A.

Second Embodiment

Hereinafter, the second embodiment of a driving apparatus will be described in detail with reference to FIGS. 9 to 13. The projecting portion 33 provided to the terminal holder 31 and the terminals 58 to 60 in the second embodiment of the driving apparatus differ in shape and structure from those of the first embodiment of the driving apparatus.

Figure 10:
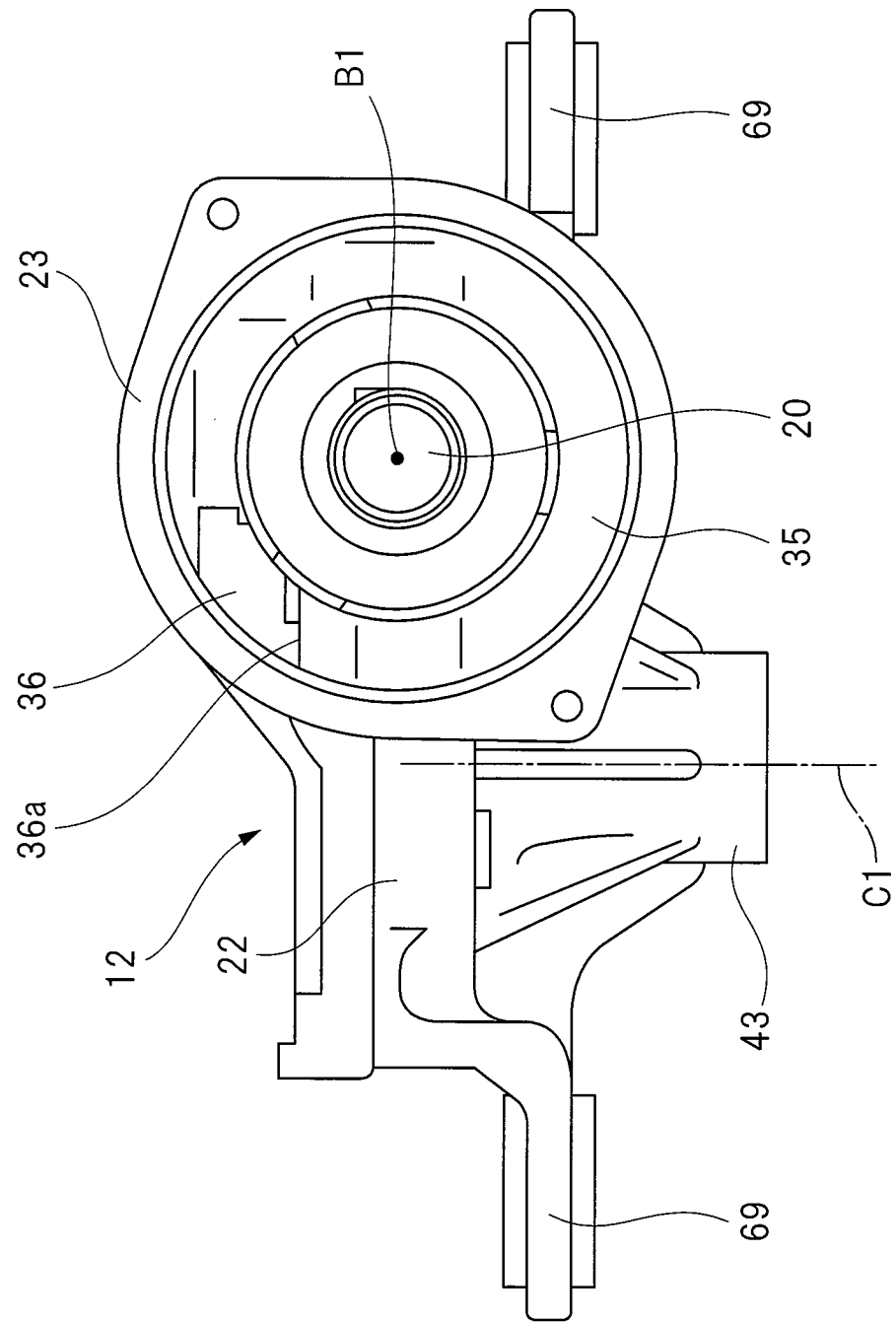
FIG. 10 is a side view of a gear case which is used in the driving apparatus of FIG. 9.
Figure 11:
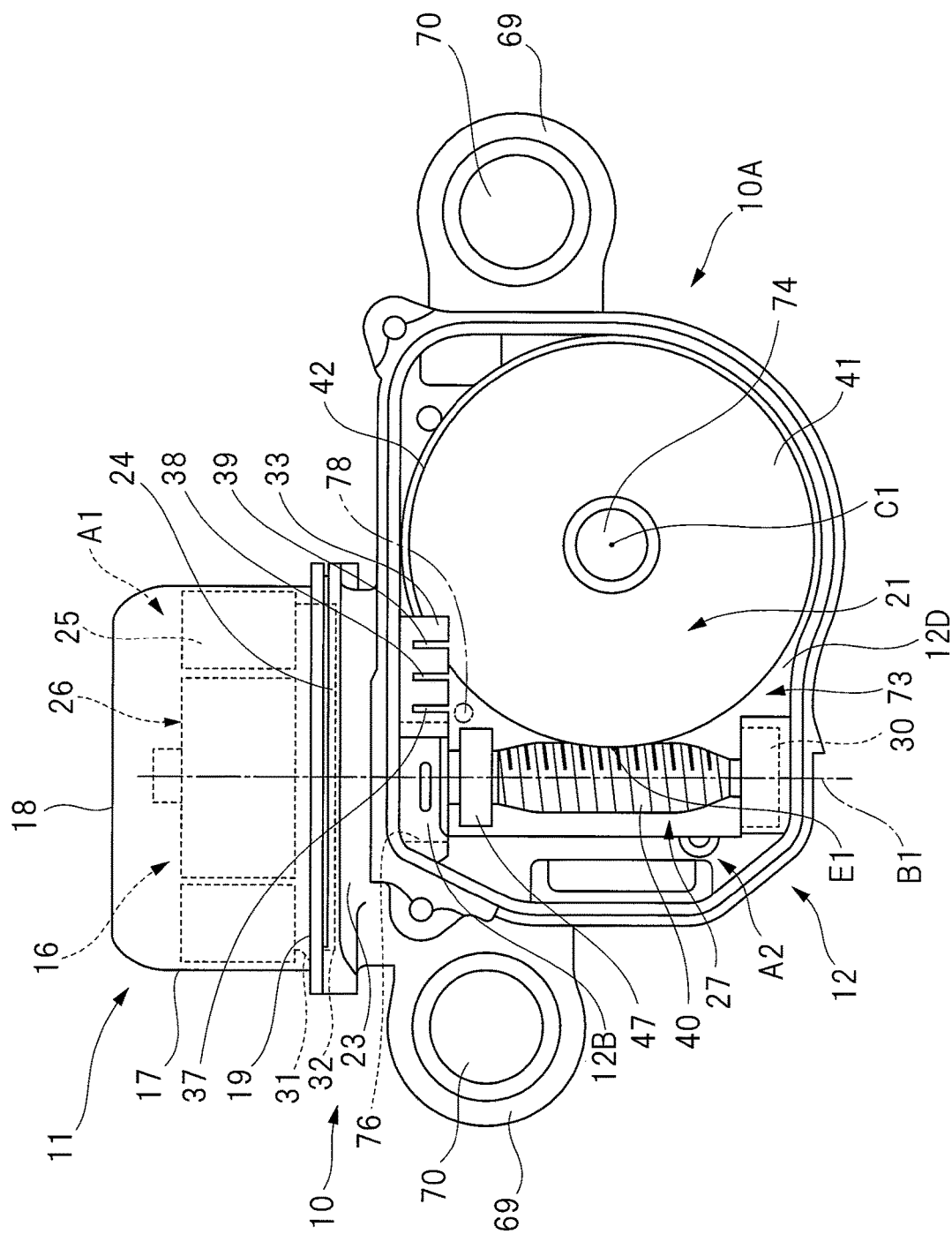
FIG. 11 is a bottom view of the driving apparatus of FIG. 9 with a cover detached from it.
Figure 12:
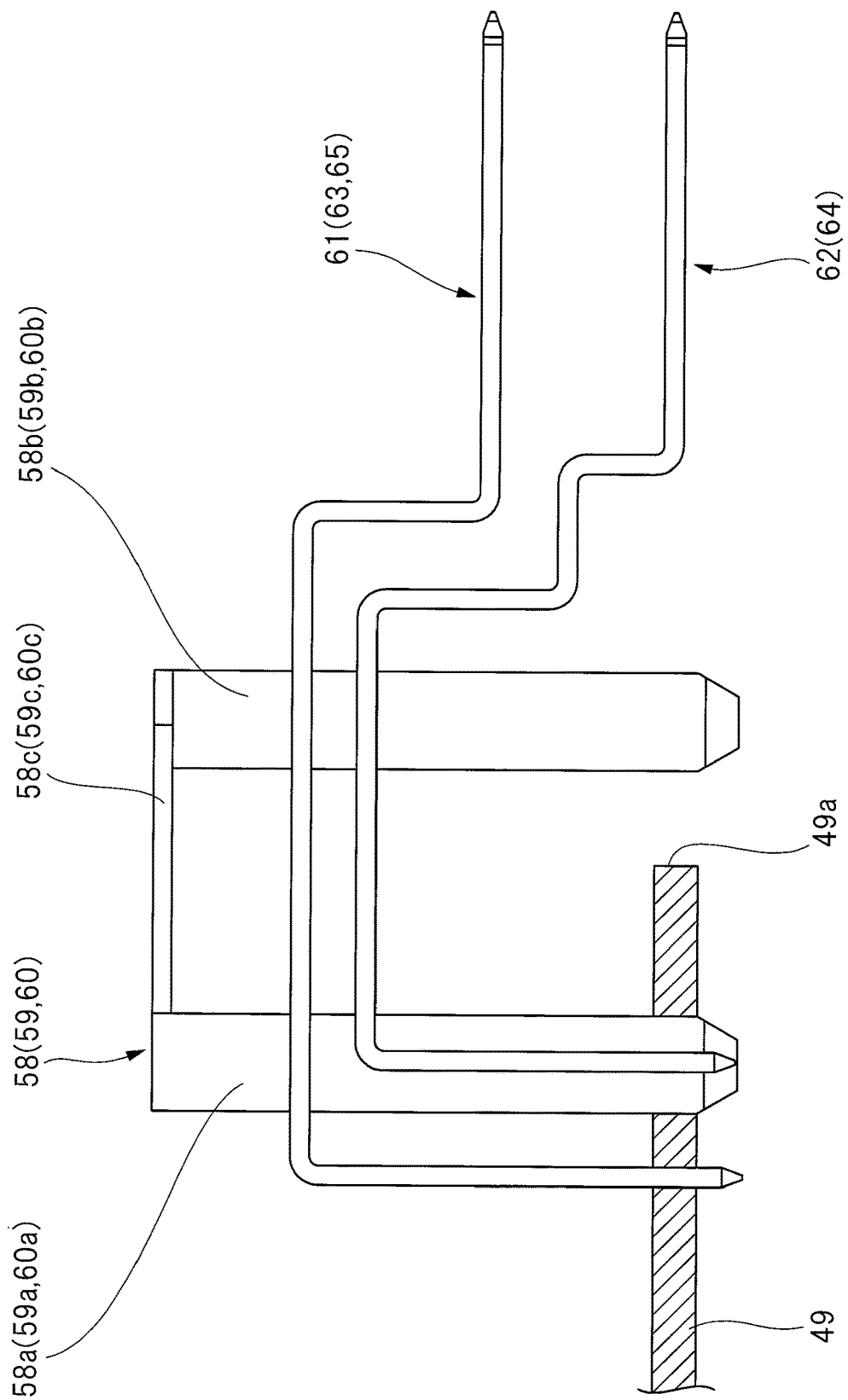
FIG. 12 is a partially-sectional view showing terminals mounted on the control board of the driving apparatus of FIG. 9.

As shown in FIG. 10, an annular recession 35 is formed in the connecting portion 23, and the cylindrical portion 32 of the terminal holder 31 is disposed in the recession 35. The gear case 12 has the through-hole 36 connecting the recession 35 of the connecting portion 23 to the second housing chamber A2. The projecting portion 33 is formed in an area defined by a predetermined interior angle along the circumference around the axis B1. The projecting portion 33 is formed into, for example, an arcuate shape disposed in an area with an interior angle smaller than 90 degrees, and has a predetermined thickness in the radial direction of a circular plane around the axis B1. As shown in FIG. 11, in a plan view of the driving apparatus 10 seen along the axis, Ba part of the area occupied by the projecting portion 33 overlaps a part of an area occupied by the worm wheel 41.

Figure 13:
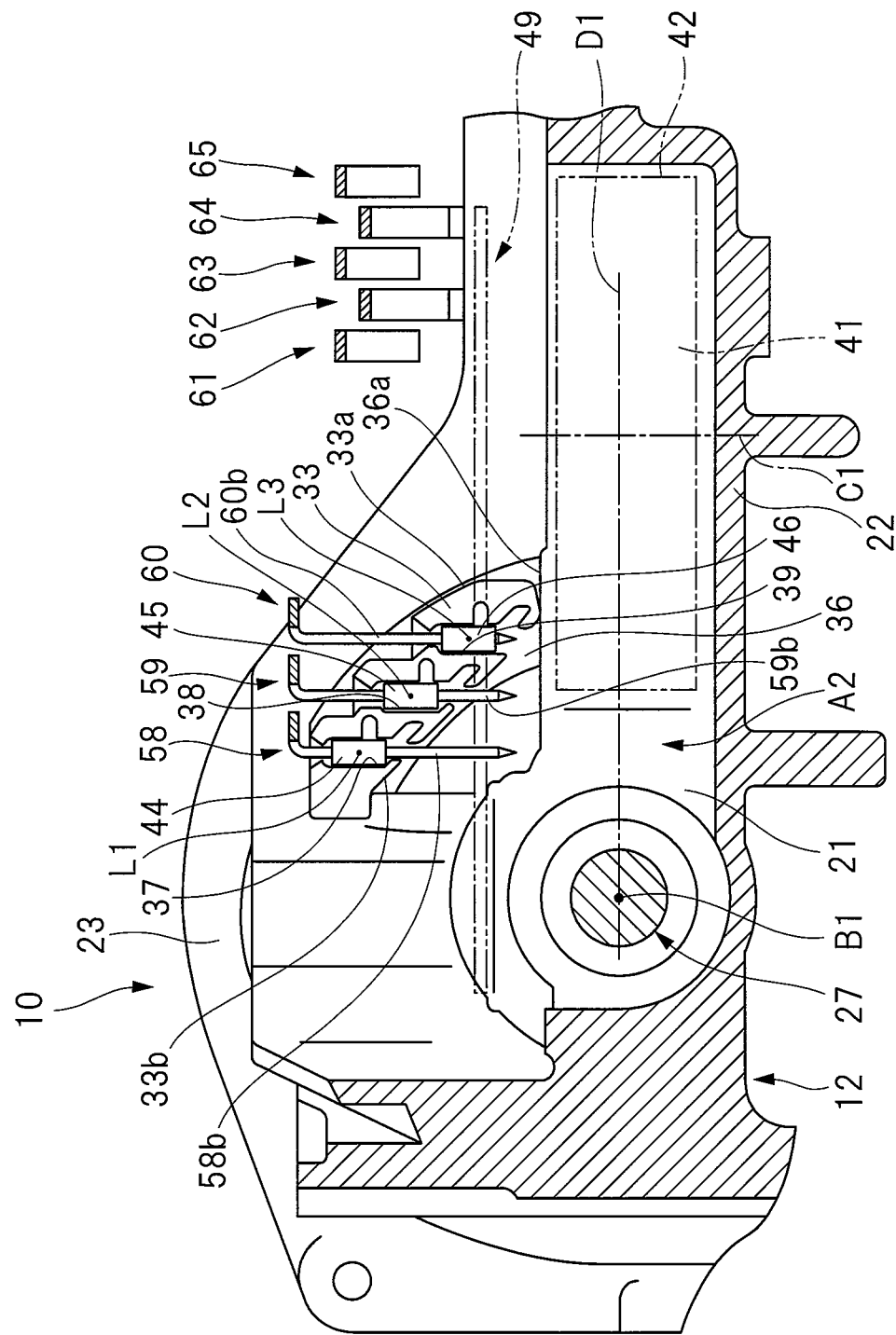
FIG. 13 is a sectional view showing the driving apparatus of FIG. 9.

With the terminal holder 31 fitted in the recession 35, the front end of the projecting portion 33 is disposed in the second housing chamber A2, as shown in FIG. 11. The part of projecting portion 33 which is disposed in the second housing chamber A2 has terminal holding slots 37, 38, and 39, as shown in FIG. 13. The terminal holding slots 37, 38, and 39 are formed by cutting portions of the projecting portion 33 out in a direction along the axis C1. In other words, the terminal holding slots 37, 38, and 39 are cutouts penetrating the projecting portion 33 from its outer surface 33a to inner surface 33b. The outer surface 33a is disposed outside the inner surface 33b in the radial direction of a circular plane around the axis B1. The terminal holding slot 37 has a center L1 in its length direction, the terminal holding slot 38 has a center L2 in its length direction, and the terminal holding slot 39 has a center L3 in its length direction. The length direction of the terminal holding slots 37, 38, and 39 is parallel with the axis C1.

Additionally, as shown in FIG. 13, the centers L1, L2, and L3 are disposed on substantially the same circumferential line around the axis B1. In other words, the distance from the axis B1 to the center L1, the distance from the axis B1 to the center L2, and the distance from the axis B1 to the center L3 are substantially the same as each other. The terminal 44 is disposed in the terminal holding slot 37, the terminal 45 is disposed in the terminal holding slot 38, and the terminal 46 is disposed in the terminal holding slot 39.

Furthermore, the terminals 44, 45, and 46 are disposed at their respective positions different from each other in the direction along the axis C1. Specifically, in the direction along the axis C1, the terminal 45 is disposed between the terminal 44 and the terminal 46. In this manner, in a plan view perpendicular to the axis B1, parts of terminals 44, 45, and 46, respectively supported by the projecting portion 33, are put in stepped arrangement.

As shown in FIG. 13, under the condition that a virtual line D1 making a right angle with the axis C1 and crossing the axis B1, the projecting portion 33 and the terminals 44, 45, and 46 are arranged between the axis B1 and the axis C1 in a direction along the virtual line D1. Other structural elements of the driving apparatus 10 of the second embodiment are the same as those of the driving apparatus 10 of the first embodiment.

Figure 9:
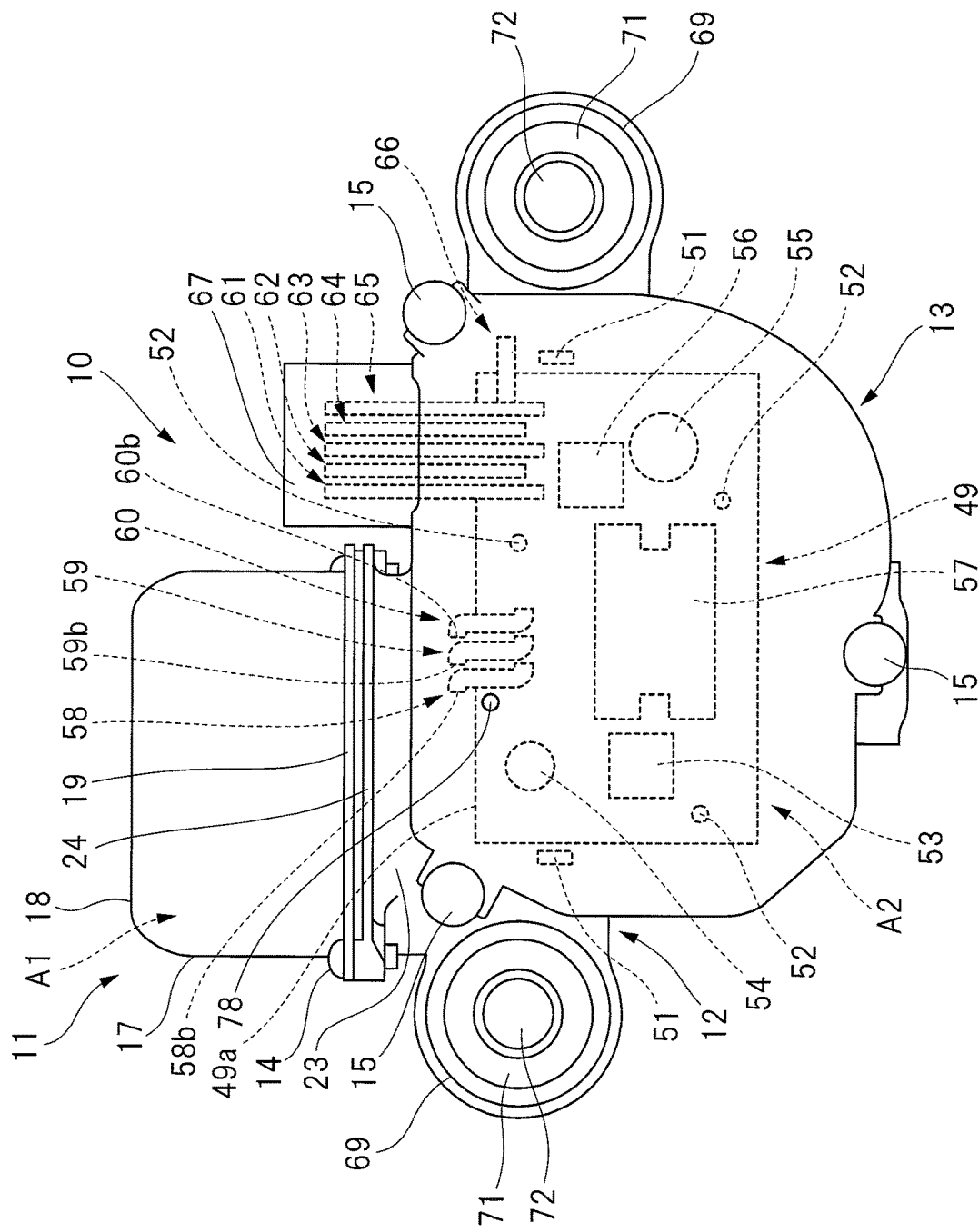
FIG. 9 is a bottom view showing the driving apparatus according to the second embodiment.

Also in the second embodiment of the driving apparatus 10, as shown in FIG. 9, the cover 13 is formed with an air hole 78. The position of the air hole 78 of the second embodiment is the same as that of the first embodiment. The second embodiment of the driving apparatus 10 thus offers the same effect as the first embodiment of the driving apparatus 10 offers.

According to another embodiment of the driving apparatus, heat of the electric components mounted on the control board is transmitted and discharged to the outside of the casing.

According to another embodiment of the driving apparatus, heat of the second housing part is transmitted and discharged to the outside of the casing.

According to another embodiment of the driving apparatus, heat of the electric motor is transmitted to the second housing part through the shaft hole, and then discharged to the outside of the casing.

The corresponding relationship between the configurations of the first and second embodiments and the configuration of the claimed driving apparatus will then be described. The electric motor 16 corresponds to an electric motor of the driving apparatus, the casing 10A corresponds to a casing of the driving apparatus, the rotating shaft 27 corresponds to a rotating shaft of the driving apparatus, the worm 40 corresponds to a worm of the driving apparatus, the worm gear 42 corresponds to a worm gear of the driving apparatus, the worm wheel 41 corresponds to a worm wheel of the driving apparatus, the terminals 44, 45, and 46 correspond to the first terminals of the driving apparatus, the terminal holder 31 corresponds to a terminal holder of the driving apparatus, and the air hole 78 corresponds to an air hole of the driving apparatus.

Furthermore, the first and second housing chambers A1 and A2 correspond to an inside of a casing of the claimed driving apparatus, the axis C1 corresponds to an axis of the driving apparatus, the engaging part E1 corresponds to an engaging part of the driving apparatus. The controller chip 53, the capacitors 54 and 55, the inductor 56, and the inverter chip 57 correspond to electric components of the driving apparatus, the control board 49 corresponds to a control board of the driving apparatus, the terminals 58, 59, and 60 correspond to second terminals of the driving apparatus. The first housing chamber A1 corresponds to a first housing chamber of the driving apparatus, the second housing chamber A2 corresponds to a second housing chamber of the driving apparatus, the wall 12B corresponds to a wall of the driving apparatus, the shaft hale 12C corresponds to a shaft hale of the driving apparatus, the gear case 12 corresponds to a gear case of the driving apparatus, and the cover 13 corresponds to a cover of the driving apparatus.

Embodiments of the driving apparatus are not limited to the above embodiments, and the driving apparatus may obviously be modified into various forms on the condition that the modification does not deviate from the substance of the present invention. For example, not only a single air hole but also a plurality of air holes may be formed on the cover. In a bottom view of the cover, the inner peripheral surface of the air hole may be any one of circular, polygonal, and elliptic shapes. Furthermore, the position of the air hole is within the area occupied by the control board in the above embodiment. The air hole, however, may be disposed in the vicinity of the area occupied by the control board. Furthermore, the terminal holding slots 37, 38, and 39 holding the terminals 44, 45, and 46, respectively, may be provided as cutouts or insertion recessions. This means that the terminal holder of the driving apparatus has insertion portions which hold the second terminals and in which the first terminals can be inserted. The insertion portions include the terminal holding slots 37, 38, and 39 and cutouts or insertion recessions (not shown).

The number of the first terminals and the number of the second terminals is not limited to 3 but may be 2 or 4 or more. The structure in which the second terminals are supported by the projecting portion may include a structure in which the second terminals are fixed to the projecting portion and a structure in which the second terminals can be attached to and detached from the projecting portion.

Furthermore, the electric motor of the driving apparatus may include a brushless motor and a motor with brushes. The motor with brushes has a commutator fixed to the rotating shaft, a brush holder fitted to the motor case, and brushes supported by the brush holder and in contact with the commutator. The brush holder carries the second terminals which are connected to the brushes.

The driving apparatus can be used as, for example, a power source for a motion device incorporated in a vehicle. Such a motion device include a wiper which operates wiper arms, a power window device which operates a window attached to a door, and a power slide door device which operates a door on the side of a vehicle body. Specifically, in the driving apparatus applied to the wiper which operates the wiper arms, when the driving apparatus is in a specific service environment where the driving apparatus is heated internally and at the same time, cooled externally by rainwater, etc., since a temperature difference between the inside and outside of the driving apparatus tends to become large, the driving apparatus according to the present invention can effectively prevent such a temperature difference.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. A driving apparatus comprising:
  a casing including: a first housing chamber in which a brushless motor is housed; and a second housing chamber;
  a rotating shaft through which a torque of the brushless motor is transmitted, the rotating shaft having an outer peripheral surface formed with a worm;
  a worm wheel which is provided in the second housing chamber, the worm wheel having a worm gear which is engaged with the worm;
  a control board on which electric components for controlling the electric motor are mounted, and which is provided in the second housing chamber;
  a terminal holder which is housed in the first housing chamber, the terminal holder having a projecting portion which supports a first terminal carrying a current to be supplied to a stator of the brushless motor; and
  a second terminal mounted on the control board; and
  an air hole which extends so as to cause the second housing chamber and an outside of the casing to communicate with each other through the air hole, wherein
  when the control board is housed in the second housing chamber, the second terminal is electrically connected to the first terminal supported by the projecting portion of the terminal holder,
  in a plan view perpendicular to an axis serving as a rotation center of the worm wheel, the air hole is disposed in the vicinity of the second terminal, thereby suppressing a rise in temperature of the first housing chamber and the second housing chamber, caused by heat generated by the brushless motor and the control board.
2. The driving apparatus according to claim 1, wherein
  in the plan view, the air hole is disposed between the rotating shaft and the second terminal in a direction perpendicular to an axis of the rotating shaft in the vicinity of an area occupied by the control board.

3. The driving apparatus according to claim 1, wherein
the casing has a gear case and a cover which covers an opening of the gear case, the gear case and the cover forming the second housing chamber,
a board cover made of insulating material and disposed between the control board and the worm wheel,
the board cover has a plurality of locking claws,
a plurality of locking portions are formed on an inner surface of the cover and the locking claws are respectively locks onto the locking portions and fixes the board cover to the cover.

4. The driving apparatus according to claim 1, further comprising:
a wall disposed in the casing, the wall partitioning an inner space of the casing into the first housing chamber and the second housing chamber; and
a shaft hole extending so as to penetrate the wall, the first housing chamber and the second housing chamber communicating with each other through the shaft hole, the rotating shaft being rotatable in the shaft hole.

5. The driving apparatus according to claim 1, wherein the casing includes:
a gear case forming the second housing chamber; and
a cover covering an opening of the gear case,
the air hole is provided to the cover, and
the control board is supported by the cover.

* * * * *